(12) United States Patent
Christenson

(10) Patent No.: US 6,389,520 B2
(45) Date of Patent: May 14, 2002

(54) METHOD FOR CONTROLLING OUT OF ORDER ACCESSING TO A MULTIBANK MEMORY

(75) Inventor: Leonard E. Christenson, Coon Rapids, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/221,210

(22) Filed: Dec. 23, 1998

(51) Int. Cl.[7] ............................................. G06F 12/00
(52) U.S. Cl. ..................... 711/157; 711/5; 711/154; 711/167; 711/169; 365/230.03; 365/230.04
(58) Field of Search .......................... 711/5, 127, 157, 711/150, 168, 167, 169, 154; 365/230.03, 230.04

(56) References Cited

U.S. PATENT DOCUMENTS 5,953,743 A * 9/1999 Jeddeloh ..................... 711/158
6,034,900 A    3/2000 Shirley et al. .............. 365/190

* cited by examiner

*Primary Examiner*—Do Hyun Yoo
*Assistant Examiner*—Jasmine Song
(74) *Attorney, Agent, or Firm*—Dorsey & Whitney LLP

(57) ABSTRACT

A method is described for interleaving bank and page access to a multibank memory device, such as an SDRAM or SLDRAM. An address detector detects a pending page access, and the associated data transfer request is then stored in a page hit register. A control timing chain includes a rank register queue with a bank access input, a page write input, and a page read input. Comparator circuitry provides bank address comparisons to avoid bank conflicts and to control the timing of insertion of the page hit register contents into the appropriate page write or page read input. While a pending page access request is stored in the page hit register, other pending bank access operations can be initiated. Consequently, bank and page accesses can be interleaved in substantially contiguous command cycles, and data transfer bandwidth is correspondingly improved.

28 Claims, 8 Drawing Sheets

METHOD FOR CONTROLLING OUT OF ORDER ACCESSING TO A MULTIBANK MEMORY

TECHNICAL FIELD

The present invention relates generally to circuitry and protocols associated with operating memory devices, and more particularly to methods for controlling multibank memory devices.

BACKGROUND OF THE INVENTION

FIG. 1 is a simplified functional block diagram of a memory device 200 that represents any of a wide variety of currently available multibank memory devices. The central memory storage unit is a memory array 202 that is arranged in a plurality of banks, with two such banks 204A and 204B shown. The memory array 202 includes a plurality of individual memory elements (not shown) for storing data, with the memory elements commonly arranged in separately addressable rows and columns, as is well known. Those skilled in the art commonly refer to a collectively addressable subset of the array 202 as a "page." Typically, a single row of memory elements in a bank of the array constitutes a particular page. In FIG. 1, a plurality of pages 206A and 206B are depicted, corresponding with banks 204A and 204B, respectively.

Particular locations within the memory array 202 are addressable by Address signals that external circuitry such as a memory controller (not shown) provides to the memory device 200. The memory controller also provides a plurality of Control or command signals that are used to designate the particular memory access type and/or sequence of memory accesses. As depicted in FIG. 1, a control/address logic circuit 208 receives the Control and Address signals, which may be provided in parallel signal paths, serially, or some suitable combination. The control/address logic circuit 208 then applies a plurality of internal control signals to control the timing and sequence of operations accessing the banks 204A and 204B via access circuits 210A and 210B, respectively. Those skilled in the art will understand that the depicted access circuits 210A and 210B represent a collection of various functional circuit components commonly found in memory devices. Examples include row and column address latch, buffer, and decoder circuits, sense amplifiers and I/O gating circuitry, and other well-known circuits adapted for particular memory device implementations.

Data written to and read from the memory array 202 is transferred from and to the memory controller or other external circuitry via a data I/O circuit 212 and the access circuits 210A and 210B. Those skilled in the art will also understand that the depicted data I/O circuit 212 represents a collection of various functional circuit components adapted to transmit data to or receive data from external circuitry and to correspondingly receive read data from or transmit write data to the array 202 via the access circuits 210A and 210B.

The memory device 200 depicted in FIG. 1 exemplifies multibank memories such as synchronous dynamic random access memories (SDRAMs) and packet-oriented or synchronous-link DRAMs (known as SLDRAMs). SDRAMs, commonly have two array banks, and SLDRAMs commonly have eight array banks. Providing multiple banks improves the average speed with which a sequence of memory operations can be performed. When access to a particular array bank is complete, a "precharge" operation is performed to prepare the corresponding access circuitry for a subsequent data transfer operation with the array bank. The precharge operation requires a certain amount of time for its completion, and therefore limits the speed with which a sequence of memory operations can be performed to a particular array bank. By organizing the memory array to have multiple banks with associated access circuits, the precharge time can, in some instances, be "hidden." For example, if a first access is to bank 204A and a subsequent access is to bank 204B, precharge operations associated with bank 204A can occur while executing memory access operations to bank 204B.

Successive memory access operations directed to a single bank ordinarily result in precharge time intervals during which memory access operations cannot be performed. However, if operations are directed to the same page in a given bank (a "page hit"), the successive operations can be performed without precharge. Thus, improving data transfer speed requires detecting the existence of such page hits and interleaving multiple bank and page hit access operations to the memory device 200.

SUMMARY OF THE INVENTION

In accordance with the present invention, a method is provided for controlling a multibank memory device. The method includes receiving first, second, and third requests. The first request is applied to the memory and a determination is made as to whether the second request is a page hit. If a page hit, the third request is applied to the memory before the second request. The second request may be temporarily stored or otherwise held, with the second request then being applied to the memory at a determined time following application of the first request.

In one aspect of the invention, a method is provided in connection with a memory controller that receives data transfer requests directed to a multibank memory. The method includes receiving first, second, and third requests, with the second request being directed to a same page as the first request. Execution of the first request is initiated, and the second request is stored. Execution of the third request is then initiated before initiating execution of the second request. The execution of the first request is monitored, and execution of the second request is initiated after execution of the first request has progressed to a predetermined extent. Monitoring the first request may be performed by loading a first address of the first request into a timing chain and successively shifting the first address through a plurality of locations within the timing chain. Execution of the second request may then be initiated after the first address has shifted through a selected one of the timing chain locations. A second address of the second request may then be inserted into the timing chain at the selected location.

In another aspect of the invention, a method is provided in connection with a multibank memory that requires a minimum page time interval between successive registration of commands addressed to the same page in one of the banks. The method includes registering a first command addressed to first page in a first bank. A second command addressed to the first page in the first bank is then held, while a third command addressed to a second bank is registered before elapse of the page time interval. After elapse of the page time interval, the second command is then registered.

DETAILED DESCRIPTION OF THE INVENTION

The following describes a novel method for controlling operations of a multibank memory, which may be included in a computer system. Certain details are set forth to provide a sufficient understanding of the present invention. However, it will be clear to one skilled in the art that the present invention may be practiced without these details. In other instances, well-known circuits, control signals, timing protocols, and software operations have not been shown in detail in order to avoid unnecessarily obscuring the invention.

Figure 1:
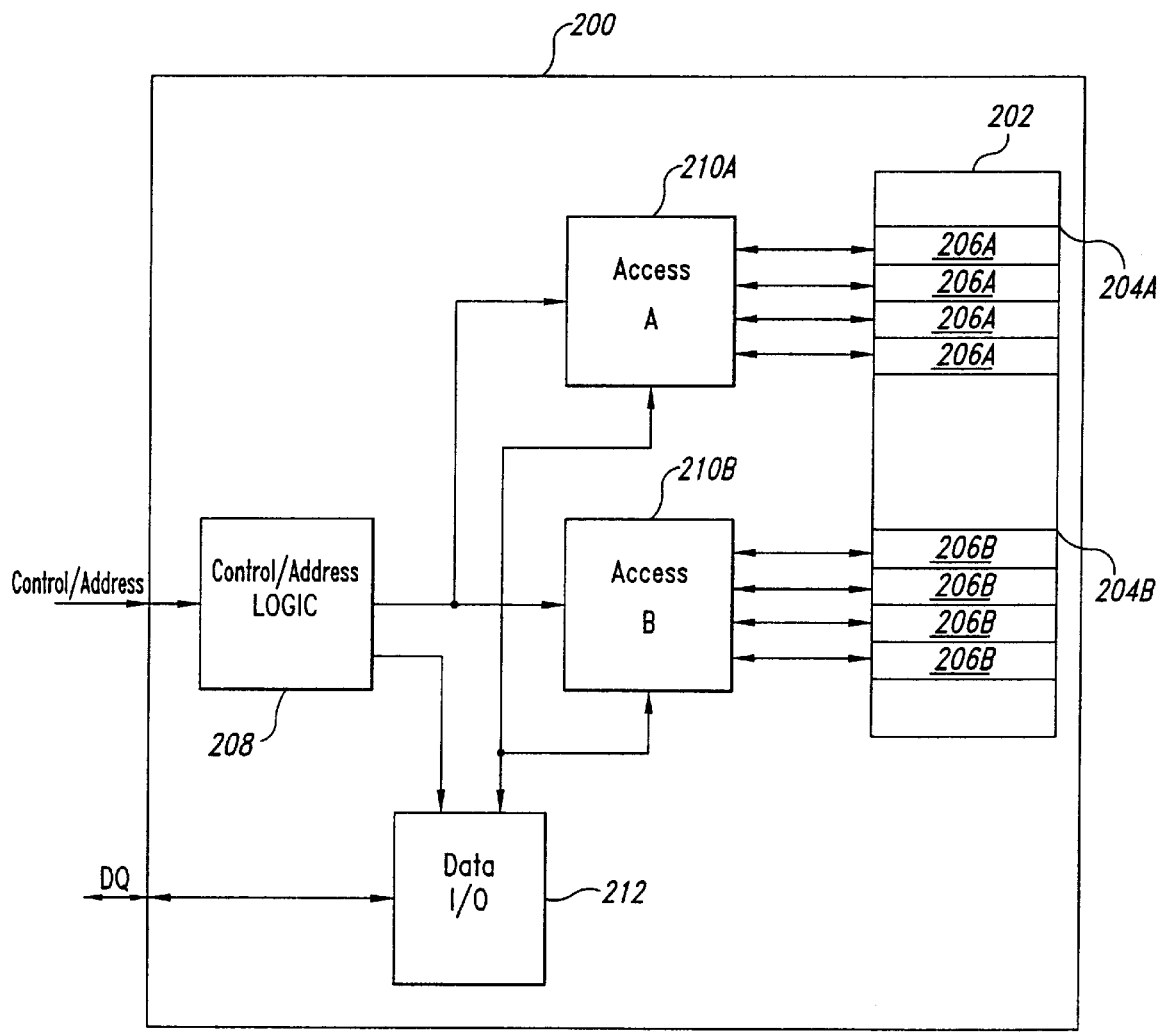
FIG. 1 is a functional block diagram depicting a memory device in accordance with the prior art.
Figure 2:
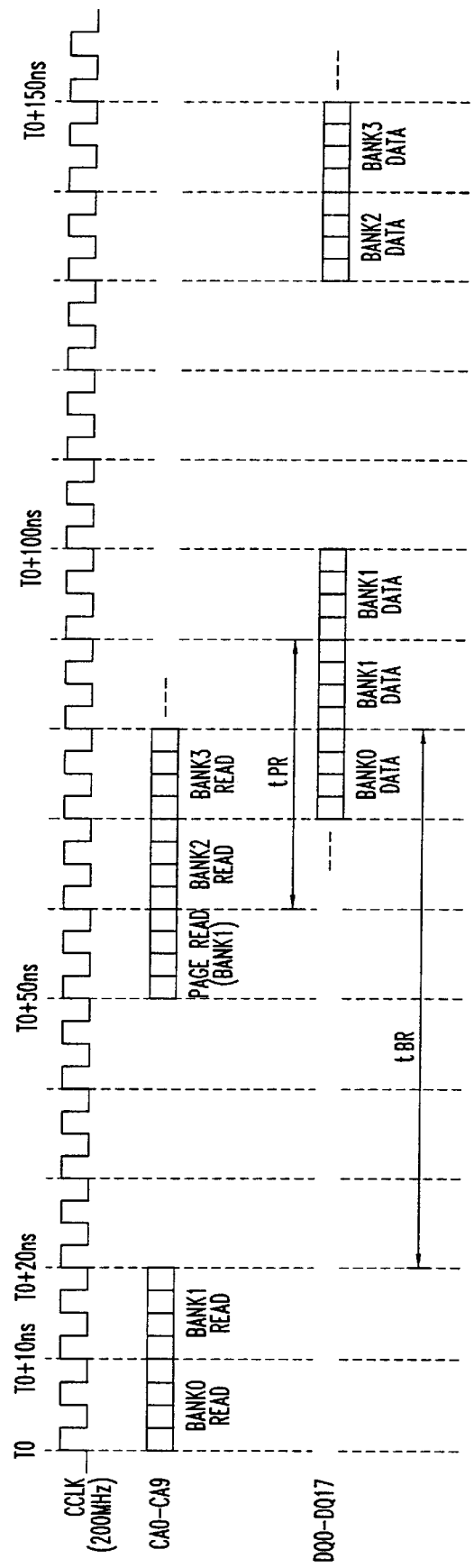
FIG. 2 is a timing diagram depicting SLDRAM operations.

FIG. 2 is a timing diagram depicting the operation of an SLDRAM in the event of a page hit. As is known to those skilled in the art, control and address information is provided to the SLDRAM in the form of packets, with each packet including a sequence of packet words registered at respective clock "ticks" (rising or falling edges of a command clock signal). Memory access commands are provided as packets of four control/address words CA0–CA9. The commands are registered at times referenced to the command clock signal CCLK during successive command time intervals of four clock ticks each. Data input to or output from the SLDRAM is in the form of data packets, with each data packet including a sequence of four data words DQ0–DQ17. For purposes of convenient depiction, the data is shown with reference to CCLK, although those skilled in the art understand that data clock signals are used in an SLDRAM.

Referring to FIG. 2, first and second commands are registered during successive ten nanosecond command time intervals. The first registered command is a bank read command addressed to a location in bank0, and the second registered command is a bank read command addressed to a location in bank1. Following the bank read time interval tBR (also known as read latency), data read from the respective banks is then delivered as packets of four data words. FIG. 2 depicts the particular bank read time interval tBR for bank1. Following the bank read command addressed to a location in bank1, the next command depicted is a page read command to bankI (i.e., a page hit). Although precharge of bank1 is not required when a page hit occurs, the different read latencies for bank read operations and for page read operations require a time lapse between registration of the bank read command and the page read command. Following the page read time interval tPR (also known as page read latency), another packet of data words is then delivered from bank1.

After registration of the page read command, successive commands to other banks may then be registered. FIG. 2 depicts a bank read command addressed to a location in bank2, followed by a bank read command addressed to a location in bank3. The data read from banks 2 and 3 is then delivered as corresponding packets of four data words following the associated bank read time intervals. The operations depicted in FIG. 2 show interleaved bank and page accesses without the large time penalties associated with bank precharge operations. However, significant idle time intervals still occur during which memory access commands are not registered and during which the data bus remains idle. Thus, an alternative approach to interleaved bank and page memory accesses can provide still further performance improvements.

Figure 3:
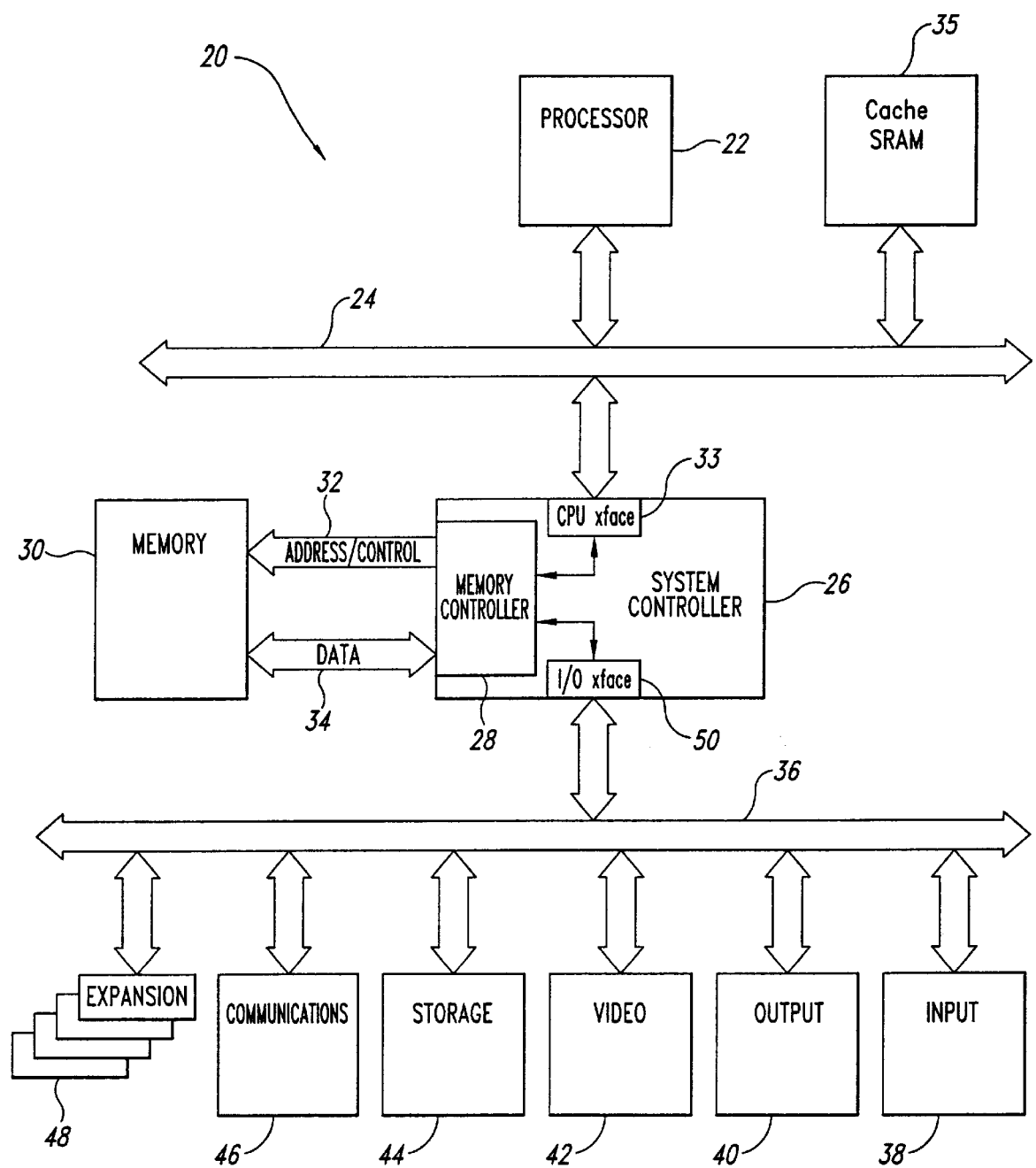
FIG. 3 is a functional block diagram depicting a computer system adapted to perform a method in accordance with an embodiment of the present invention.

FIG. 3 shows a computer system 20 adapted to perform a method in accordance with an embodiment of the present invention. The central processing unit (CPU), such as a microprocessor 22, is coupled with a system controller 26 (also known as corelogic) by a host or processor bus 24 that carries address, data, and control signals therebetween. The system controller 26 includes a memory controller 28 for accessing a main memory 30 via a memory address/control bus 32 and a memory data bus 34. The microprocessor 22 may be any of a wide variety of processors, such as Pentium-type processors manufactured by Intel or other x86-type architecture processors manufactured by AMD, Cyrix, and others. The main memory may include any of a wide variety of multibank DRAMs. Examples include DRAMs manufactured by Micron Technology, Inc., such as SDRAMs, SLDRAMs, etc. If the main memory 30 is populated by SDRAMs, the address/control bus 32 would typically be implemented as separate address and control buses, as is well known by those skilled in the art. If the main memory is populated by SLDRAMs, the address/control bus 32 is then a single bus adapted for transmission of command and address packets, as is well known to those skilled in the art.

The system controller 26 also includes CPU interface circuitry 33 that couples the microprocessor 22 with other components of the system controller. The system controller 26 also includes a cache controller (not shown) for controlling data transfer operations to a cache memory 35 that provides higher speed access to a subset of the information stored in the main memory 30. The cache memory 35 may include any of a wide variety of suitable high-speed memory devices, such as static random access memory (SRAM) modules manufactured by Micron Technology, Inc.

The system controller 26 also functions as a bridge circuit (sometimes called the host bus bridge or North bridge) between the processor bus 24 and a system bus, such as I/O bus 36. The I/O bus 36 may itself be a combination of one or more bus systems with associated interface circuitry (e.g., AGP bus and PCI bus with connected SCSI and ISA bus systems). Multiple I/O devices 38–46 are coupled with the I/O bus 36. Such I/O devices include a data input device 38 (such as a keyboard, mouse, etc.), a data output device 40 (such as a printer), a visual display device 42 (commonly coupled with the system controller 26 via a high-speed PCI or AGP bus), a data storage device 44 (such as a disk drive, tape drive, CD-ROM drive, etc.), and a communications device 46 (such as a modem, LAN interface, etc.). Additionally expansion slots 48 are provided for future accommodation of other I/O devices not selected during the original design of the computer system 20.

FIG. 3 depicts the various I/O devices 38–46 as being coupled with the controller via single, shared I/O bus 36 and an I/O interface 50 integrated within the system controller. However, those skilled in the art will understand that the depicted I/O interface 50 represents one or more I/O interfaces, as appropriate to a particular computer system design. Also, the I/O bus 36 may itself be a multiple bus and bridge network. Those skilled in the art will understand, therefore, that the depiction of FIG. 3 encompasses any of a wide variety of suitable interconnection structures between the I/O devices 38–46 and other components of the computer system 20. Likewise, the computer system 20 could include multiple processors with multiple host bus bridges and multiple memories with associated memory controllers. Therefore, those skilled in the art will understand the particular depiction of FIG. 3 to encompass any of a wide variety of computer system architectures.

Figure 4:
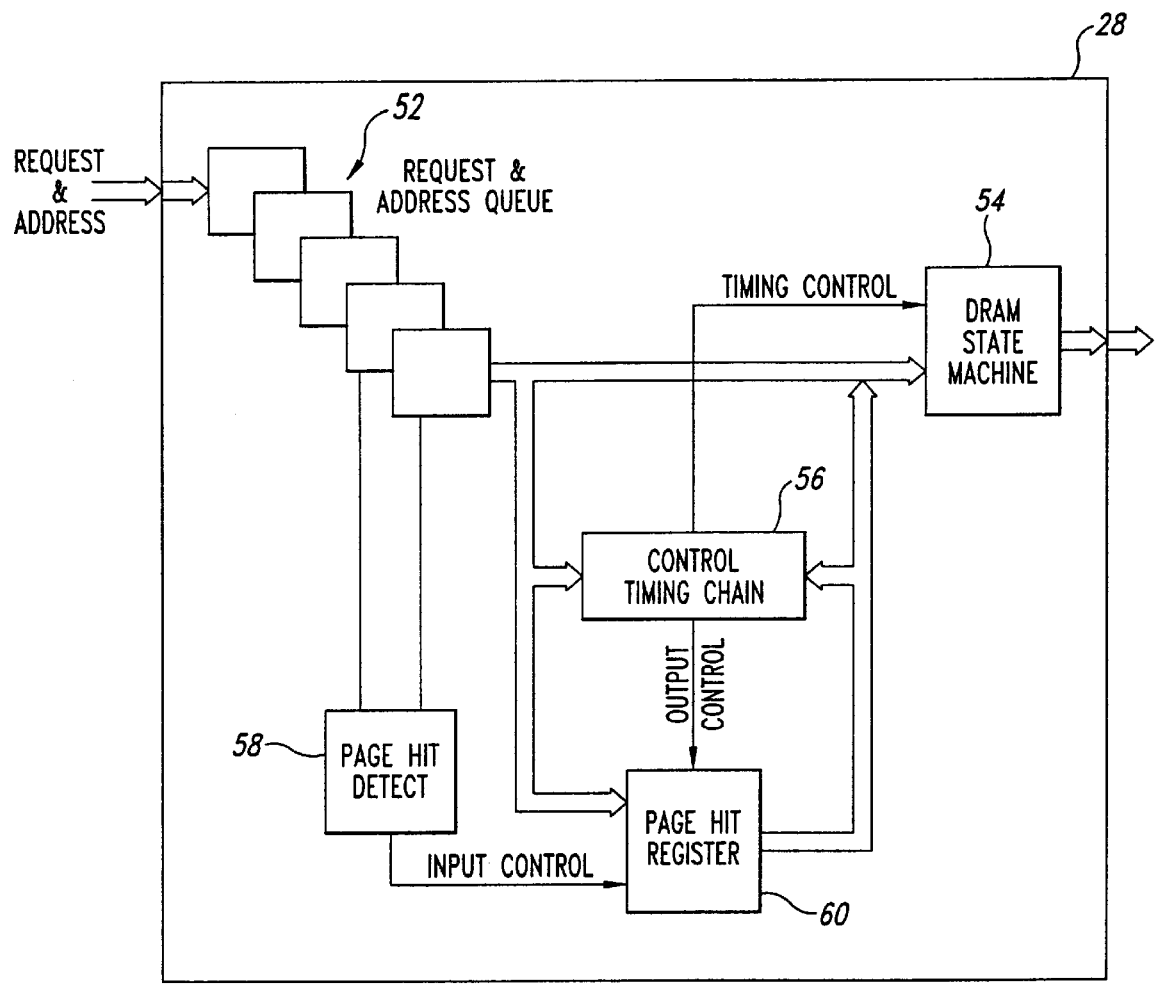
FIG. 4 is a functional block diagram depicting a memory controller included in the computer system of FIG. 3.

FIG. 4 is a functional block diagram depicting portions of the memory controller 28. The memory controller 28 receives a request and associated address from circuitry, such as from the CPU interface 33 or the I/O interface 50 in response to corresponding signals produced by the microprocessor 22 or one of the I/O devices 38–46 (see FIG. 3). Typically, the request is for a memory read or write operation, but may instead be a specialized operation used, for example, during computer system initialization. Each request and associated address is first stored in a request buffer or queue 52. Requests stored in the request queue 52 may then be reorganized or prioritized to optimize data transfer operation speed or other parameters, as is well known to those skilled in the art of multibank memory controller design.

The memory controller 28 includes a DRAM state machine 54 that receives a request and associated address from the request queue 52 and produces the well-known control signal sets and sequences to initiate the corresponding memory access operations. The particular control signal types and protocols of the DRAM state machine 54 vary, depending on the particular multibank memory device types populating the main memory 30 (see FIG. 3). For an SDRAM, example control signals include the row address strobe (RAS), column address strobe (CAS), write enable (WE), and chip select (CS) signals. For an SLDRAM, example control signals include the packet-defined control/address signals that indicate device identification, command code, bank address, row address, and column address values. Details of the various control signals and protocols are well known to those skilled in the art and need not be described herein.

A control timing chain circuit 56 applies a plurality of timing control signals to the DRAM state machine 54. The control timing chain 56 controls the time at which the DRAM state machine 54 registers a request and associated address from the request queue 52. In particular, and as described in detail below, the control timing chain 56 determines whether bank conflicts or bus conflicts exist between pending requests stored in the request queue 52 and requests previously registered in the DRAM state machine 54.

The memory controller 28 also includes page hit detect circuitry 58 coupled with the request queue 52. As depicted, the page hit detect circuitry 58 is coupled with the final ranks of the request queue 52. The page hit detect circuitry 58 includes comparator circuitry for comparing the request addresses stored in these final ranks, as will be understood by those skilled in the art. The page hit detect circuitry 58 produces an input control signal applied to a page hit register 60. In the event a page hit occurs, the input control signal is asserted to enable the page hit register to store the page hit request and associated address. Once the page hit request has been stored in the page hit register 60, other pending requests stored in the request queue 52 may then be registered in the DRAM state machine 54 under control of the control timing chain 56. The control timing chain 56 also produces an output control signal applied to the page hit register 60 to control subsequent provision of the page hit request to the DRAM state machine 54.

Figure 5:
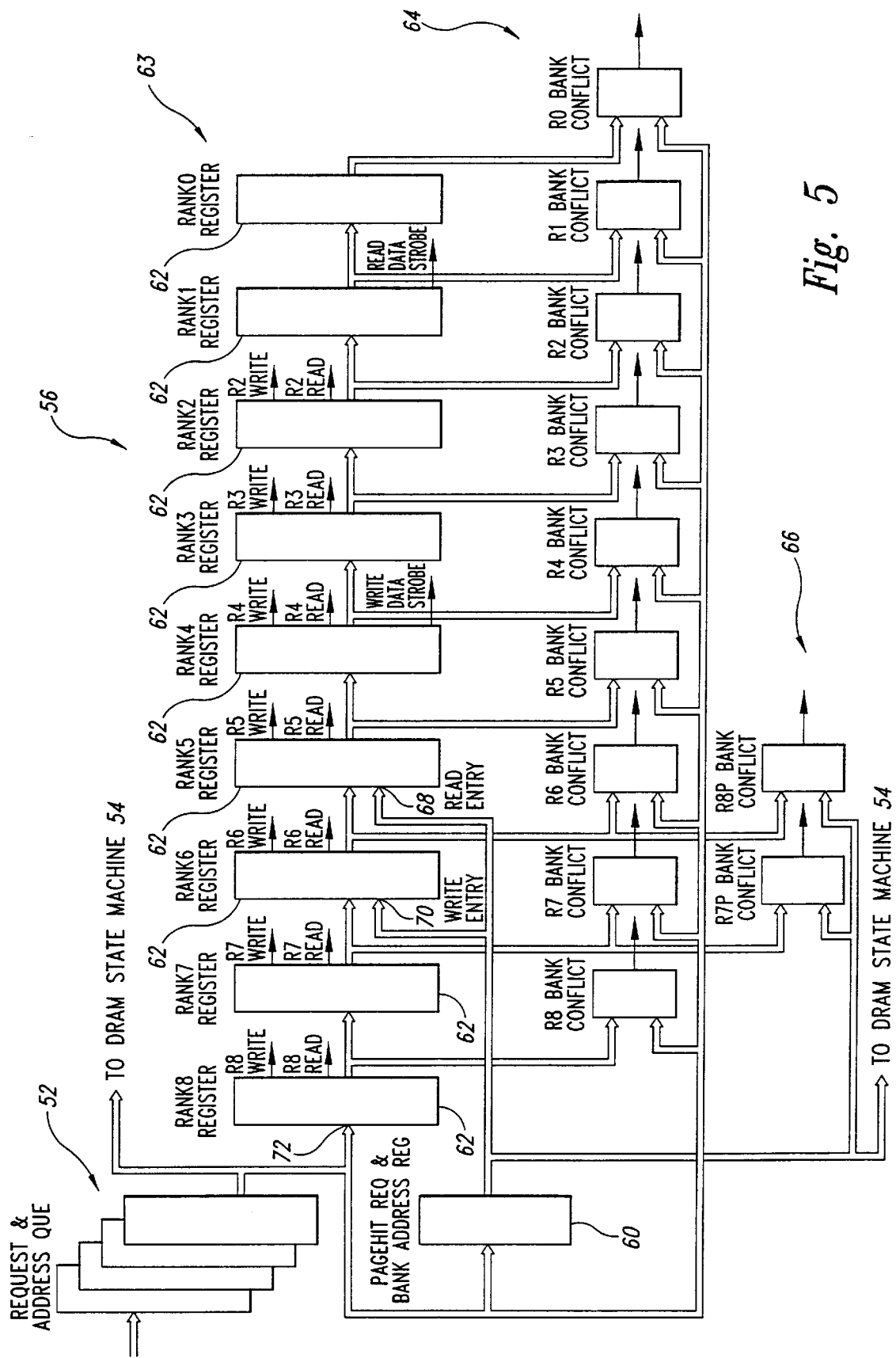
FIG. 5 is a functional block diagram depicting control timing chain circuitry included in the memory controller of FIG. 4.

FIG. 5 is a functional block diagram that shows the page hit register 60, the request queue 52, and particular details of the control timing chain 56. The control timing chain 56 includes a plurality of rank registers 62, depicted as Rank8–Rank0, which are coupled to form a rank register queue 63. Associated with each of the rank registers 62 is a respective one of a plurality of bank conflict comparators 64, depicted as R8–R0. When a request is registered in the DRAM state machine 54, portions of that request are registered in the Rank8 register. In particular, the Rank8 register stores the bank address as well as information about whether the particular request is a read or write request. With each successive command time period (one clock cycle for an SDRAM or four clock ticks for an SLDRAM), the contents of the rank registers 62 are shifted to a next lower order rank. For example, in the next command time period following initial registration of the request information in the Rank8 register, that information is then shifted to the Rank7 register, and so on, to propagate the request information through the rank register queue 63.

The bank address of a next pending request stored in the request queue 52 is applied to each of the bank conflict comparators 64 at a first comparator input. A second input of each of the bank conflict comparators 64 receives the bank address stored in a corresponding one of the rank registers 62. In this way, the control timing chain 56 determines whether a next pending request stored in the request queue 52 presents a bank conflict with any of the previously registered requests currently being executed by the DRAM state machine 54. Each of the bank conflict comparators 64 produces a comparison output signal to indicate whether such a bank conflict exists. As known to those skilled in the art, a bank conflict occurs when the next pending request is directed to a bank in which operations are currently being performed. Unless the next pending request is a page hit, the control timing chain 56 will not allow its registration until the previously registered conflicting request has cleared the rank register queue 63.

Each of the rank registers 62 outputs a Write or a Read signal indicating the request type associated with the address currently stored in the respective rank register. Such information concerning write or read access is important for determining the existence of bus conflicts, as is well understood by those skilled in the art. For example, a write request following a read request requires an intervening idle time interval for turnaround of the external memory data bus. Similarly, a read request following a write request requires a time interval for turnaround of the internal memory data bus/pipeline. Thus, the control timing chain 56 also includes circuitry (not shown) to account for bus/pipeline turnaround times, as well as to account for bank conflicts as particularly depicted in FIG. 5. The timing of the well-known Write Data and Read Data strobe signals may also be conveniently controlled by the rank register queue 63, as shown in FIG. 5.

As discussed above in connection with FIG. 4, when a page hit is detected, the page hit request is stored in the page hit register 60 for subsequent provision to the DRAM state machine 54 at the appropriate time. FIG. 5 shows the page hit register 60 and the page hit entry points into the rank registers 62. In the particular depiction of FIG. 5, a page hit write request is inserted at the Rank6 register, and a page hit read request is inserted at the Rank5 register, as consistent with the particular page read and write latencies for an SLDRAM. Those skilled in the art will understand that the page hit entry points may vary (as may the number of rank registers included in the rank register queue 63) depending on the timing specifications of particular multibank memory devices being controlled by the memory controller 28.

Page bank conflict comparators 66 compare the bank address of the request stored in the page hit register 60 with the bank address of the Rank7 and Rank6 registers to ensure proper timing of page hit request insertion. In the particular embodiment depicted in FIG. 5, after a bank write request clears the Rank7 register (as indicated by the respective one of the page bank conflict comparators 66), a page hit write request to that bank may then be inserted in the Rank6 register in the next command time period (at which time the bank write request has shifted to the Rank5 register). After a bank read request clears both the Rank7 and Rank6 registers (as indicated by the page bank conflict comparators 66), a page hit read request to that bank may then be inserted in the Rank5 register in the next command time period (at which time the bank read request has shifted to the Rank4 register).

Thus, the control timing chain 56 has separate inputs for bank and page accesses—namely, the inputs to the Rank5 and Rank6 registers being read and write page access inputs 68 and 70, respectively, and the input to the Rank8 register being a bank access input 72. By temporarily storing a page hit request in the page hit register 60 (and later insertion at a page access input 68 or 70 of the control timing chain 56), subsequent requests stored in the request queue 52 may be applied to the DRAM state machine 54 (see FIG. 4) and correspondingly registered in the rank register queue 63 at the bank access input 72.

For example, a first bank write request directed to a first bank is applied to the DRAM state machine 54 and to the bank access input 72 for registration in the Rank8 register of the control timing chain 56. If the next pending request is a page write to the first bank, this request is then stored in the page hit register 60 during the next command time period, and the first bank write request shifts to the Rank7 register. During the next command time period, a second bank write request directed to a second bank can be applied to the DRAM state machine 54 and to the bank access input 72 for registration in the Rank8 register (the first bank write request has now shifted to the Rank6 register). During the next command time period, the first bank write request shifts to the Rank5 register, the second bank write request shifts to the Rank7 register, and the page write request is applied to the DRAM state machine 54 and inserted at the page access input 70 into the Rank6 register (i.e., in between the first and second bank write requests). Thus, the timing advantages associated with a page hit may be exploited without delaying registration of other pending requests to other banks in the multibank memory device.

Figure 6:
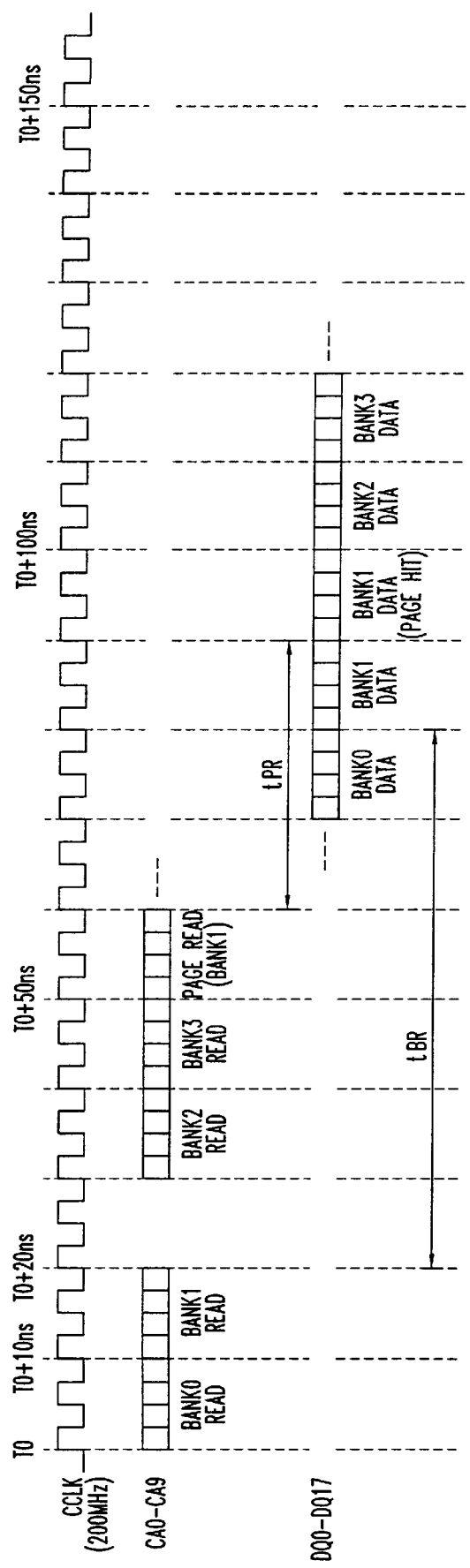
FIGS. 6 and 7 are timing diagrams depicting SLDRAM operations in accordance with an embodiment of the present invention.
Figure 7:
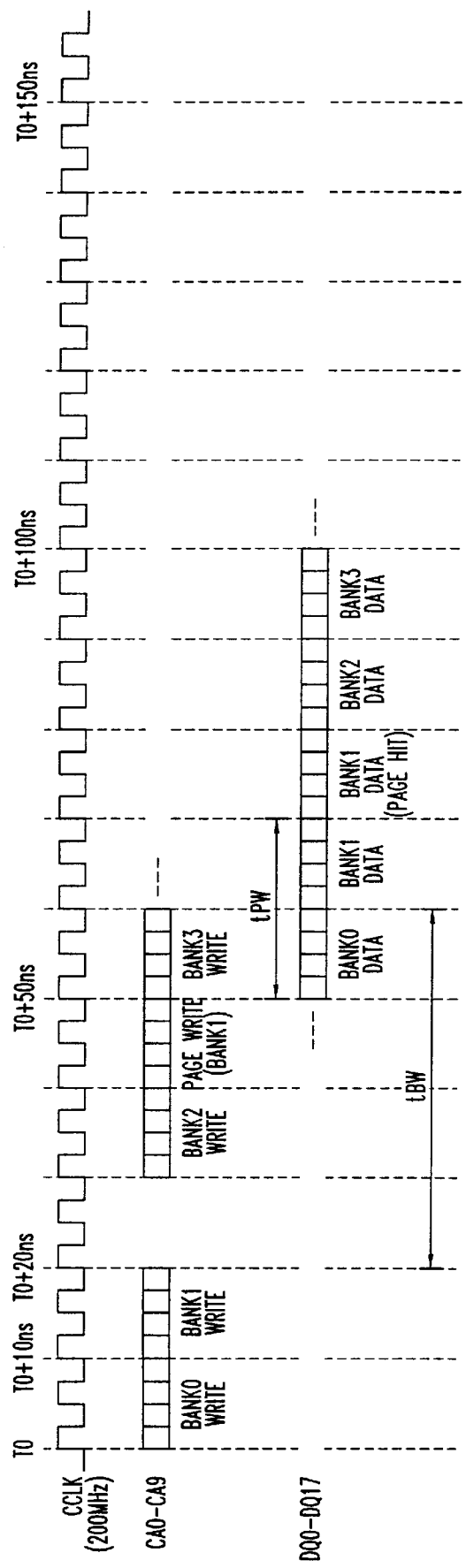

FIGS. 6 and 7 are timing diagrams that depict operation of an SLDRAM in accordance with an embodiment of the present invention, such as by using the memory controller 28 described above in connection with FIGS. 4 and 5. Requests stored in the request queue 52 are registered as corresponding commands in the SLDRAM, as is well known to those skilled in the art. FIG. 6 depicts a sequence of read operations, and FIG. 7 depicts a sequence of write operations. In each case, operations are directed sequentially to bank0, bank1, bank2, and bank3, with two successive operations directed to bank1 (the second being a page hit).

Referring to FIG. 6, a first command is registered during a first ten nanosecond command time interval, with the first registered command being a bank read command addressed to a location in bank0. During the next command time interval, a second command is registered, with the second command being a bank read command addressed to a location in bank1. The next pending request received from the request queue 52 is a page read to bank1 (i.e., a page hit), which is then temporarily stored in the page hit register 60 (see FIGS. 4 and 5). Subsequently, commands addressed to other banks can be successively registered, such as the depicted bank read commands addressed to locations in bank2 and bank3. The page read command is then registered during a command time period determined by the control timing chain 56 (as described above in connection with FIG. 5), consistent with timing specifications for bank read time tBR and page read time tPR. Data read from the various banks then appear on the data bus as successive data packets, including the page hit data from bank1 immediately following the first accessed data from bank1. In contrast to the operations described above in connection with FIG. 2, there is no data bus idle time.

Referring to FIG. 7, a first registered command is a bank write command addressed to a location in bank0. A second registered command is a bank write command addressed to a location in bank1. The next pending request received from the request queue 52 is a page write to bank1 (i.,e., a page hit), which is then temporarily stored in the page hit register 60 (see FIGS. 4 and 5). Subsequently, a command addressed to another bank can be registered, such as the depicted bank write command addressed to a location in bank2. The page write command is then registered during a command time period determined by the control timing chain 56 (as described above), consistent with timing specifications for bank write time tBW and page write time tPW. Other commands can then be registered, such as the depicted bank write command directed to bank3. As with successive read operations, embodiments of the present invention can provide a continuous data stream on the data bus for successive write operations, including a page hit write operation.

Figure 8:
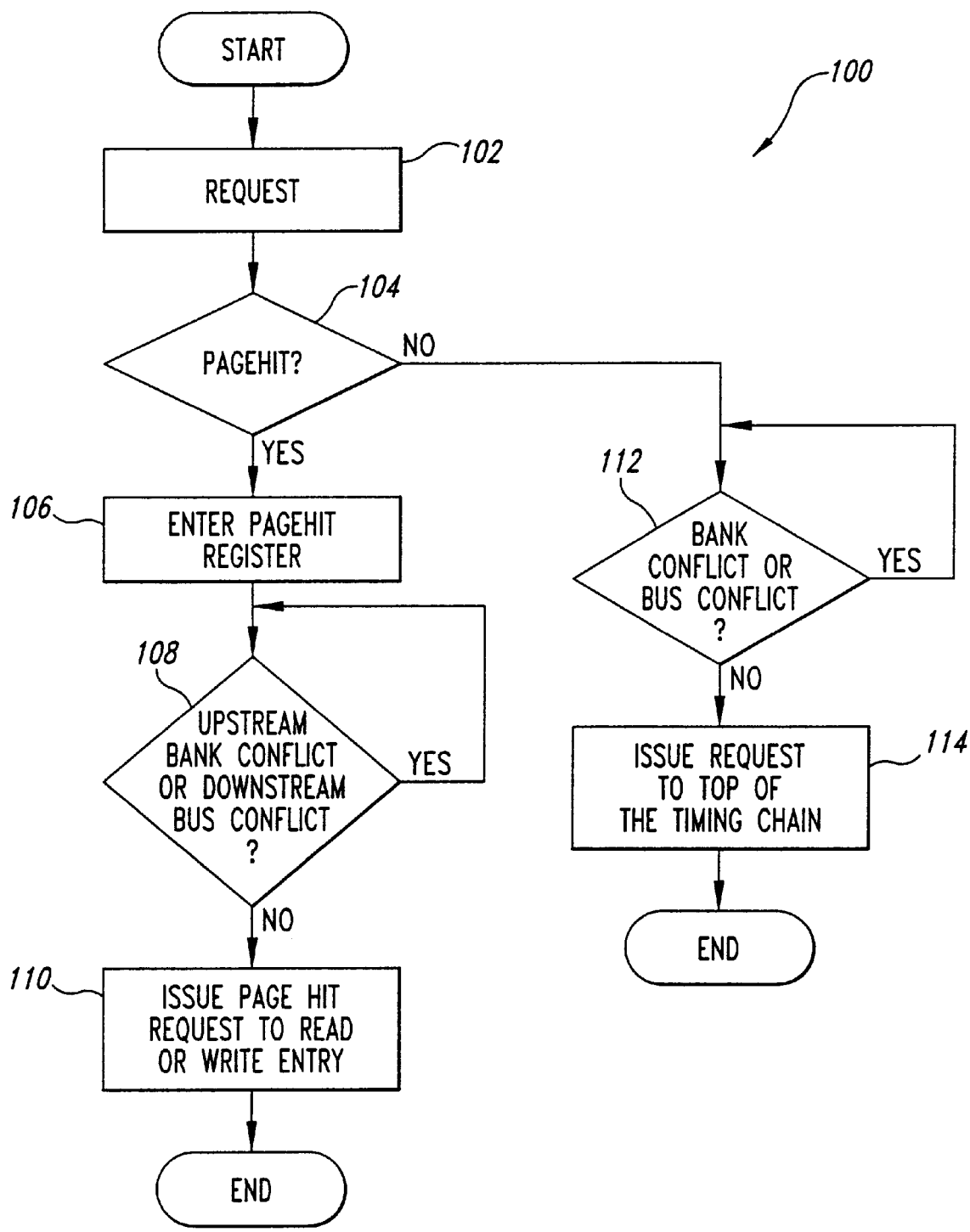
FIG. 8 is a process flow diagram depicting a method of controlling multibank memory operations in accordance with an embodiment of the present invention.

FIG. 8 is a process flow diagram depicting a method 100 of operating a multibank memory device in accordance with an embodiment of the present invention. Operations begin upon receipt of a Request at step 102. In step 104, it is determined whether the Request is a page hit. If a page hit, the Request is then stored in step 106. Subsequently, it is determined whether a bus conflict or bank conflict exists in step 108. The bank conflict determination amounts to waiting for the previously issued bank request (to which the stored Request is a page hit) to progress in execution sufficient to then initiate the page hit operations. Once it has been determined that no bank or bus conflicts exist, the Request is initiated and control timing chain insertion occurs in step 110. Operations associated with the method 100 then cease pending receipt of another Request.

If the Request is determined not to be a page hit in step 104, the Request is treated like any other bank access request. The existence of any bus or bank conflicts is determined in step 112. Once it has been determined that no such conflicts exist, the Request is then initiated and control timing chain registration occurs in step 114. Operations associated with the method 100 then cease pending receipt of another Request. Of course, while a page hit request is being processed according to operations 106–110, another bank access request may be processed according to operations 112–114.

A number of advantages are provided by the above-described embodiments of the present invention. FIGS. 6 and 7 show the improved data transfer speeds made possible by an interleaved bank and page hit memory control method in accordance with an embodiment of the present invention. Although much of the discussion above is directed to exemplary SLDRAM protocols and timing parameters, those skilled in the art will readily understand the applicability of the present invention to SDRAMs and other multibank memory devices. Although FIG. 6 shows sequential read operations only, and FIG. 7 shows sequential write operations only, those skilled in the art will also appreciate that data transfer bandwidth is significantly improved when both read and write operations are performed sequentially.

Those skilled in the art will appreciate that methods in accordance with the present invention may be performed by circuits other than those particularly depicted and described in connection with FIGS. 3–5. These figures represent just one of many possible implementations of a multibank memory control method in accordance with the present invention. Likewise, the present invention may be accomplished using process steps other than those particularly depicted and described in connection with FIG. 8.

Those skilled in the art will also understand that each of the circuits whose functions and interconnections are described in connection with FIGS. 3–5 is of a type known in the art. Therefore, one skilled in the art will be readily able to adapt such circuits in the described combination to practice the invention. Particular details of these circuits are not critical to the invention, and a detailed description of the internal circuit operation need not be provided. Similarly, each one of the process steps described in connection with FIG. 8 is of a type well known in the art, and may itself be a sequence of operations that need not be described in detail in order for one skilled in the art to practice the invention.

It will be appreciated that, although specific embodiments of the invention have been described for purposes of illustration, various modifications may be made without deviating from the spirit and scope of the invention. For example, the above-described location of control timing chain page access inputs relative to the bank access input is exemplary, and may well vary depending on particular memory device timing specifications. Those skilled in the art will appreciate that many of the advantages associated with the circuits and processes described above may be provided by other circuit configurations and processes. Indeed, a number of suitable circuit components can be adapted and combined in a variety of circuit topologies to implement a multibank memory control method in accordance with the present invention.

Those skilled in the art will also appreciate that various terms used in the description above are sometimes used with somewhat different, albeit overlapping, meanings. For example, the term "bank" may refer solely to a memory array bank, or may refer both to an array bank and its associated access circuitry. The term "request" or "command" may refer solely to a request or command type (e.g., read or write), or may refer also to the associated address to which the request or command is directed. One skilled in the art will understand, therefore, that terms used in the following claims are properly construed to include any of various well-known meanings. Accordingly, the invention is not limited by the particular disclosure above, but instead the scope of the invention is determined by the following claims.

What is claimed is:

1. A method of controlling a multibank memory, comprising:

receiving a first request directed to a first bank of the memory;

receiving a second request directed to the first bank;

receiving a third request directed to a second bank of the memory;

determining if the second request is a page hit;

applying the first request to the memory;

if the second request is a page hit, then applying the third request to the memory before applying the second request to the memory; and if the second request is a page hit, storing the second request to one of a plurality of rank registers, the one of the plurality of rank registers being selected based on at least one of a read latency characteristic or a write latency characteristic of the multibank memory.

2. The method of claim 1, further comprising:

determining a time at which to apply the second request to the memory; and applying the second request to the memory at the determined time.

3. The method of claim 2 wherein determining the time at which to apply the second request to the memory includes determining when a predetermined time interval has elapsed following the application of the first request to the memory.

4. The method of claim 1, further comprising:

receiving a fourth request directed to a third bank of the memory; and if the second request is a page hit, then applying the fourth request to the memory before applying the second request to the memory.

5. The method of claim 1 wherein each of the first, second, and third requests is a respective one of first, second, and third read requests.

6. The method of claim 1 wherein each of the first, second, and third requests is a respective one of first, second, and third write requests.

7. A method of controlling a multibank memory, comprising:

receiving a first request, a second request, and a third request;

applying the first request to the memory;

determining if the second request is a page hit; and if the second request is a page hit, then:

storing the second request to one of a plurality of rank registers, the one of the plurality of rank registers being selected based on at least one of a read latency characteristic or a write latency characteristic of the multibank memory;

determining if the third request creates a bank conflict;

if the third request does not create a bank conflict, then applying the third request to the memory before applying the second request to the memory;

determining if the second request creates a bank conflict; and when the second request does not create a bank conflict, then applying the second request to the memory.

8. The method of claim 7 wherein determining if the second request creates a bank conflict includes monitoring time elapse following the application of the first request to the memory.

9. The method of claim 7 wherein determining if the third request creates a bank conflict includes comparing an address associated with the third request to an address associated with the first request.

10. The method of claim 7, further comprising:

receiving a fourth request; and if the second request is a page hit, then:

determining if the fourth request creates a bank conflict; and if the fourth request does not create a bank conflict, then applying the fourth request to the memory before applying the second request to the memory.

11. The method of claim 7 wherein each of the first, second, and third requests is a respective one of first, second, and third read requests.

12. The method of claim 7 wherein each of the first, second, and third requests is a respective one of first, second, and third write requests.

13. In a memory controller operable to receive data transfer requests directed to a memory having a plurality of banks, a method of controlling request execution timing, comprising:

receiving a first request directed to a first page in a first of the banks;

receiving a second request directed to the first page in the first bank;

receiving a third request directed to a second of the banks;

initiating execution of the first request;

storing the second request to one of a plurality of rank registers, the one of the plurality of rank registers being selected based on at least one of a read latency characteristic or a write latency characteristic of the memory;

initiating execution of the third request prior to initiating execution of the second request;

monitoring the execution of the first request; and initiating execution of the second request after the execution of the first request has progressed to a predetermined extent.

14. The method of claim 13 wherein monitoring the execution of the first request includes loading a first address of the first request into the timing chain and successively shifting the first address through a plurality of locations within the timing chain, and wherein initiating the execution of the second request includes loading a second address of the second request into the timing chain after the first address has shifted through a selected one of the locations.

15. The method of claim 13 wherein monitoring the execution of the first request includes:

loading a first address of the first request into the timing chain; and successively moving the first address through a plurality of locations in the timing chain;

and wherein initiating the execution of the second request includes:

monitoring the movement of the first address through a selected one of the locations in the timing chain; and loading a second address of the second request into the selected location of the timing chain after the first address has moved therethrough.

16. The method of claim 13 wherein:

initiating execution of the first request includes loading a first address of the first request into the timing chain and successively moving the first address through a plurality of locations in the timing chain;

initiating execution of the second request includes loading a second address of the second request into the timing chain and successively moving the second address through the timing chain; and initiating the execution of the third request includes loading a third address of the third request into the timing chain and successively moving the third address through the timing chain, the second address being located within the timing chain between the first and third addresses.

17. A method of controlling operations in a memory having a plurality of banks, each having a plurality of pages, the memory operable to register commands and requiring a minimum page time interval between successive registration of commands directed to a same page in one of the banks, the method comprising:

registering a first command addressed to a first one of the pages in a first one of the banks;

holding a second command addressed to the first page in the first bank, the second command being held in one of a plurality of rank registers, the one of the plurality of rank registers being selected based on at least one of a read latency characteristic or a write latency characteristic of the memory;

registering a third command addressed to a second of the banks prior to elapse of the page time interval; and registering the second command after elapse of the page time interval.

18. The method of claim 17, further comprising registering a fourth command addressed to a third of the banks prior to elapse of the page time interval.

19. The method of claim 17 wherein each of the first, second, and third commands is a respective one of first, second, and third read commands.

20. The method of claim 17 wherein each of the first, second, and third commands is a respective one of first, second, and third write commands.

21. A method of controlling a multibank memory, comprising:

receiving a first request directed to a first bank of the memory;

receiving a second request directed to the first bank;

determining if the second request is a page hit; and if the second request is a page hit, storing the second request to one of a plurality of rank registers, the one of the plurality of rank registers being selected based on at least one of a read latency characteristic or a write latency characteristic of the multibank memory.

22. The method of claim 21 wherein the step of storing the second request to one of a plurality of rank registers comprises storing the second request to one of a plurality of rank registers of a control timing circuit.

23. The method of claim 21 wherein the step of the second request is a write page hit, and wherein storing the second request to one of a plurality of rank registers comprises storing the second request to one of a plurality of rank registers, the one of the plurality of rank registers being selected based on a write latency characteristic of the multibank memory.

24. The method of claim 21 wherein the second request is a read page hit, and wherein the step of storing the second request to one of a plurality of rank registers comprises storing the second request to one of a plurality of rank registers, the one of the plurality of rank registers being selected based on a read latency characteristic of the multibank memory.

25. The method of claim 21, further comprising:

receiving a third request directed to a second bank of the memory; and if the second request is a page hit, then applying the third request to the memory before applying the second request to the memory.

26. The method of claim 21, further comprising determining a time at which to apply the second request to the memory and applying the second request to the memory at the determined time.

27. The method of claim 26 wherein the step of determining the time at which to apply the second request to the memory includes determining when a predetermined time interval has elapsed following the application of the first request to the memory.

28. The method of claim 25, further comprising:

receiving a fourth request directed to a third bank of the memory; and if the second request is a page hit, then applying the fourth request to the memory before applying the second request to the memory.

* * * * *